(12) United States Patent
Niemeyer et al.

(10) Patent No.: US 10,975,795 B2
(45) Date of Patent: Apr. 13, 2021

(54) METHOD FOR THE MODEL-BASED CONTROL AND REGULATION OF AN INTERNAL COMBUSTION ENGINE

(71) Applicant: MTU FRIEDRICHSHAFEN GMBH, Friedrichshafen (DE)

(72) Inventors: Jens Niemeyer, Friedrichshafen (DE); Andreas Flohr, Deggenhausertal (DE); Jörg Remele, Hagnau (DE); Christian Wolf, Eriskirch (DE)

(73) Assignee: MTU FRIEDRICHSHAFEN GMBH, Friedrichshafen (DE)

( * ) Notice: Subject to any disclaimer, the term of this patent is extended or adjusted under 35 U.S.C. 154(b) by 0 days.

(21) Appl. No.: 16/652,652

(22) PCT Filed: Jul. 20, 2018

(86) PCT No.: PCT/EP2018/069839
§ 371 (c)(1),
(2) Date: Mar. 31, 2020

(87) PCT Pub. No.: WO2019/076501
PCT Pub. Date: Apr. 25, 2019

(65) Prior Publication Data
US 2020/0240347 A1 Jul. 30, 2020

(30) Foreign Application Priority Data
Oct. 16, 2017 (DE) ................... 10 2017 009 582.5

(51) Int. Cl.
*F02D 41/24* (2006.01)
*F02D 41/14* (2006.01)
*F02D 41/30* (2006.01)

(52) U.S. Cl.
CPC ......... *F02D 41/2406* (2013.01); *F02D 41/14* (2013.01); *F02D 41/3005* (2013.01); *F02D 2041/1433* (2013.01)

(58) Field of Classification Search
CPC ..... F02D 2041/1412; F02D 2041/1433; F02D 41/0002; F02D 41/14; F02D 41/1406;
(Continued)

(56) References Cited

U.S. PATENT DOCUMENTS 5,323,748 A * 6/1994 Foster ................... F02D 41/005
123/435
7,302,314 B2 11/2007 Sommer
(Continued)

FOREIGN PATENT DOCUMENTS

DE 10101311 A1 8/2002
DE 102006004516 B3 3/2007
(Continued)

OTHER PUBLICATIONS

Harder Karsten et al: "Nonlinear MPC with 1-7 emission control for a real-world off-highway diesel engine", 2017 IEEE International Conference on Advanced Intelligent Mechatronics (AIM), IEEE, Jul. 3, 2017 (Jul. 3, 201), pp. 1768-1773, XP033144574

*Primary Examiner* — Carl C Staubach
(74) *Attorney, Agent, or Firm* — Lucas & Mercanti, LLP; Klaus P. Stoffel (57) ABSTRACT

A method for model-based control and regulation of an internal combustion engine. An emission class for operating the engine is read from a first library by an optimizer; a maximum mechanical component load is read from a second library by the optimizer using the engine type; and the emission class and the component load are set as mandatory for a combustion model and a gas path model. Injection system target values for actuating injection system actuators are calculated using the combustion model based on a target
(Continued)

torque. Gas path target values for actuating gas path actuators are calculated using the gas path model based on the target torque. A quality measurement is calculated by the optimizer based on the injection system and gas path target values. The quality measurement is minimized by the optimizer by changing the injection system and gas path target values within a prediction horizon. The injection system and gas path target values are set as decisive for adjusting the operating point of the engine by the optimizer using the minimized quality measurement.

7 Claims, 4 Drawing Sheets

(58) Field of Classification Search
CPC .. F02D 41/2406; F02D 41/26; F02D 41/3005; F02D 41/40; Y02T 10/40
See application file for complete search history.

(56) References Cited

U.S. PATENT DOCUMENTS

| | | | | |
|---|---|---|---|---|
| 9,482,169 | B2* | 11/2016 | Hodzen | ............... F02D 41/005 |
| 10,787,984 | B2* | 9/2020 | Charbonnel | ........ F02D 41/2432 |
| 2011/0172897 | A1 | 7/2011 | Tsuzuki | |
| 2016/0025020 | A1 | 1/2016 | Hodzen | |
| 2016/0144863 | A1* | 5/2016 | Bevan | ................... B60W 10/06 |
| | | | | 701/54 |
| 2018/0112616 | A1* | 4/2018 | Wang | ...................... F02D 41/26 |
| 2018/0216558 | A1 | 8/2018 | Buchholz | |
| 2020/0240344 | A1* | 7/2020 | Buchholz | ................ F02D 41/40 |
| 2021/0003090 | A1* | 1/2021 | Bergmann | .............. F02D 41/40 |

FOREIGN PATENT DOCUMENTS

| | | |
|---|---|---|
| EP | 2977575 A1 | 1/2016 |
| WO | 2017005337 A1 | 1/2017 |
| WO | 2017102039 A1 | 6/2017 |

* cited by examiner

METHOD FOR THE MODEL-BASED CONTROL AND REGULATION OF AN INTERNAL COMBUSTION ENGINE

CROSS-REFERENCE TO RELATED APPLICATIONS

The present application is a 371 of International application PCT/EP2018/069839, filed Jul. 20, 2018, which claims priority of DE 10 2017 009 582.5, filed Oct. 16, 2017, the priority of these applications is hereby claimed and these applications are incorporated herein by reference.

BACKGROUND OF THE INVENTION

The invention relates to a method for model-based control and regulation of an internal combustion engine in the case of which an emission class for operation of the internal combustion engine is read in by an optimizer from a first library, a maximum mechanical component load is read out by the optimizer from a second library on the basis of the internal combustion engine type, the emission class and the maximum component load are set as binding for a combustion model and a gas path model, and in the case of which, as a function of a setpoint moment, injection system setpoint values for actuating the injection system actuators are calculated via the combustion model and gas path setpoint values for actuating the gas path actuators are calculated via a gas path model.

The characteristics of an internal combustion engine are decisively determined via an engine control unit as a function of a power requirement. To this end, corresponding characteristic lines and characteristic fields are applied in the current software of the engine control unit. The actuating variables of the internal combustion engine are calculated via said characteristic lines and characteristic fields from the power requirement, for example, a setpoint moment, for example, the start of injection and a necessary rail pressure. These characteristic lines/characteristic fields are populated with data at the manufacturer of the internal combustion engine on a test stand. The plurality of these characteristic lines/characteristic fields and the correlation of the characteristic lines/characteristic fields to one another nevertheless result in a high adjustment outlay.

Attempts are therefore made in practice to reduce the adjustment outlay by the use of mathematical models. DE 10 2006 004 516 B3 thus describes, for example, a Bayes network with probability tables in order to specify an injection quantity and US 2011/0172897 a method for adaptation of the start of injection as well as the injection quantity via combustion models by means of neuronal networks. It is critical here that only trained data are mapped which only have to be learned in the case of a test stand run.

US 2016/0025020 A1 discloses a model-based regulation method for the gas path of an internal combustion engine. The gas path comprises both the air side and the exhaust gas side in addition to exhaust gas recirculation. In a first step of the method, the current operating situation of the internal combustion engine is ascertained from the measurement variables of the gas path, for example, the charge air temperature or the NOx concentration. In a second step, a quality measure within a prediction horizon is then also calculated from the measurement variables via a physical model of the gas path. The actuating signals for the actuators of the gas path are then in turn specified in a third step from the quality measure and the operating situation. The indicated method relates exclusively to the gas path and is based on a linearized gas path model. A loss of information is unavoidable as a result of the linearization.

SUMMARY OF THE INVENTION

The object on which the invention is based is therefore to develop a method of model-based control and regulation of the entire internal combustion engine at high quality.

The method lies in the fact that an emission class for the operation of the internal combustion engine is read in by an optimizer from a first library, a maximum mechanical component load is read out by the optimizer from a second library on the basis of the internal combustion engine type and the emission class and the maximum component load are set as binding for a combustion model and a gas path model. The invention furthermore lies in, as a function of a setpoint moment, injection system setpoint values for actuating the injection system actuators being calculated via the combustion model and gas path setpoint values for actuating the gas path actuators being calculated via the gas path model and a quality measure being calculated by the optimizer as a function of the injection system setpoint values and the gas path setpoint values. The method is supplemented in that the quality measure is minimized by the optimizer via changing the injection system setpoint values and gas path setpoint values within a prediction horizon and the injection system setpoint values and gas path setpoint values are set by the optimizer on the basis of the minimized quality measure as decisive for adjustment of the operating point of the internal combustion engine.

The various legal emission classes in accordance with the global area of application, for example, IMO or Level 4f, are stored in the first library. As a result of this, different emission objectives can be represented for one and the same internal combustion engine type. The reduced adjustment outlay and greater flexibility are advantageous in terms of the place of use. In one provided option, the operator can influence the maintenance interval via the second library with the maximum mechanical component load. For example, a reduced combustion peak pressure signifies a longer period of use until the next maintenance date. The freedom of choice is therefore advantageous here. Once a library has been adjusted, it can obviously be transferred to an internal combustion engine of the same type with a changed number of cylinders.

The minimized quality measure is determined in that a first quality measure is calculated by the optimizer at a first point in time, a second quality measure is forecast with the prediction horizon at a second point in time and subsequently a deviation of the two quality measures is determined. If the deviation is smaller than a threshold value, the second quality measure is set as the minimized quality measure by the optimizer. The threshold value consideration is in this regard a cancellation criterion since a further minimization would not lead to more precise adjustment. Instead of the threshold value consideration, a predefinable number of new calculations can also be set as a cancellation criterion.

On the basis of the minimized quality measure, a rail pressure setpoint value for a subordinate rail pressure regulation circuit is predefined indirectly by the optimizer as the injection system setpoint value and a start of injection and an end of injection for actuating an injector directly. In addition, the gas path setpoint values, for example, a lambda setpoint value for a subordinate lambda regulation circuit and an EGR setpoint value for a subordinate EGR regulation circuit are then predefined indirectly by the optimizer.

Both the combustion model and the gas path model map the system characteristics of the internal combustion engine as mathematical equations. These are determined once on the basis of a reference internal combustion engine in the case of a test stand run, what is known as the DoE test stand run (DoE: Design of Experiments) or from simulation tests. A differentiation between a stationary and transient operation, for example, in the case of a load upshift during generator operation, is no longer necessary. The setpoint moment is furthermore set precisely while maintaining the emission threshold values. The models are individually adjustable, wherein the models in total map the internal combustion engine. The characteristic lines and characteristic fields previously required can thus be dispensed with. The known advantages of a program-based solution such as capacity for retrofitting or adjustment to legal requirements are also provided here.

BRIEF DESCRIPTION OF THE DRAWING

One preferred exemplary embodiment is represented in the figures. In the figures.

DETAILED DESCRIPTION OF THE INVENTION

Figure 1:
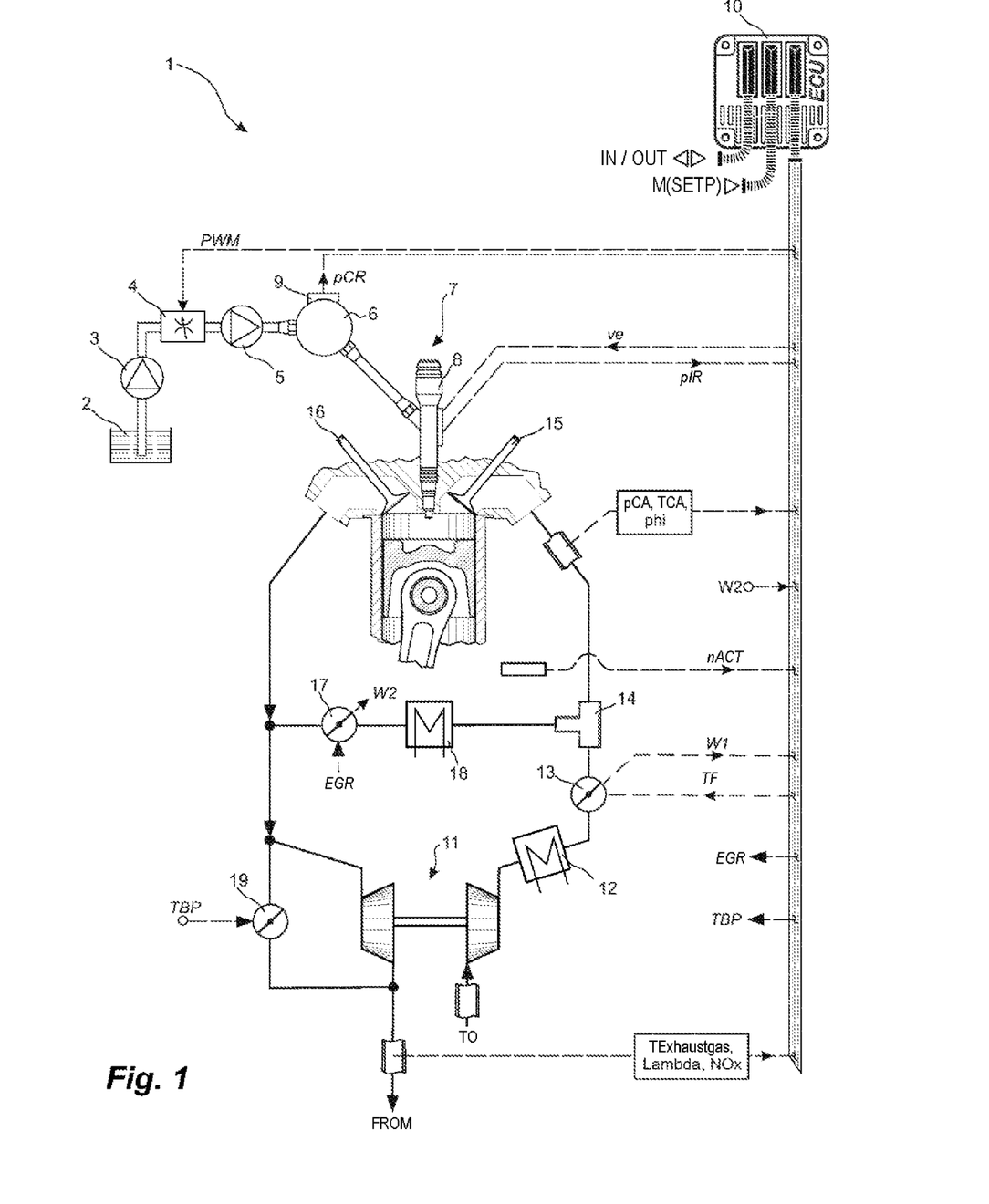
FIG. 1 shows a system diagram.

FIG. 1 shows a system diagram of an electronically controlled internal combustion engine 1 with a common rail system. The common rail system comprises the following mechanical components: a low-pressure pump 3 to convey fuel from a fuel tank 2, a changeable suction throttle 4 for influencing the fuel volumetric flow flowing through, a high-pressure pump 5 for conveying the fuel under increased pressure, a rail 6 for storing the fuel and injectors 7 for injecting the fuel into the combustion chambers of internal combustion engine 1. The common rail system can also optionally be embodied with individual stores, wherein an individual store 8 is then integrated as additional buffer volume, for example, in injector 7. The further functionality of the common rail system is required as known.

The represented gas path comprises both the air supply and exhaust gas discharge. The compressor of an exhaust gas turbocharger 11, a charge air cooler 12, a throttle flap 13, an entry point 14 to combine the charge air with the recirculated exhaust gas and inlet valve 15 are arranged in the air supply. An outlet valve 16, the turbine of exhaust gas turbocharger 11 and a turbine bypass valve 19 are arranged in the exhaust gas discharge. An exhaust gas recirculation path branches off from the exhaust gas discharge, in which exhaust gas recirculation path an EGR actuator 17 for adjusting the EGR rate and EGR cooler 18 are arranged.

The mode of operation of internal combustion engine 1 is determined by an electronic control unit 10 (ECU). Electronic control unit 10 contains the normal components of a microcomputer system, for example, a microprocessor, I/O components, buffers and storage components (EEPROM, RAM). The operating data which are relevant for the operation of internal combustion engine 1 are applied as models in the storage components. Via these, electronic control unit 10 calculates the output variables from the input variables. The key input variable is a setpoint moment M(SETP) which is predefined by an operator as a power requirement. The input variables related to the common rail system of control unit 10 are rail pressure pCR which is measured by means of a rail pressure sensor 9, and optionally individual reservoir pressure pIR. The input variables related to the air path of electronic control unit 10 are an opening angle W1 of throttle flap 13, engine rotational speed nACT, charge air pressure pCA, charge air temperature TCA and humidity phi of the charge air. The input variables related to the exhaust gas path of electronic control unit 10 are an opening angle W2 of EGR actuator 17, exhaust gas temperature TExhaustgas, air/fuel ratio lambda and the NOx actual value downstream of the turbine of exhaust gas turbocharger 11. The input variables, not represented further, of electronic control unit 10 are summarized with reference sign IN, for example, the cooling agent temperatures of a variable valve drive.

The following are represented as output variables of electronic control unit 10 in FIG. 1: a signal PWM for actuation of suction throttle 4, a signal ve for actuation of injector 7 (start of injection/end of injection), an actuating signal TF for actuation of throttle flap 13, an actuating signal EGR for actuating EGR actuator 17, an actuating signal TBP for actuation of turbine bypass valve 19 and an output variable OUT. Output variable OUT is representative of the further actuating signals for control and regulation of internal combustion engine 1, for example, for an actuating signal for activation of a second exhaust gas turbocharger in the case of sequential turbocharging.

Figure 2:
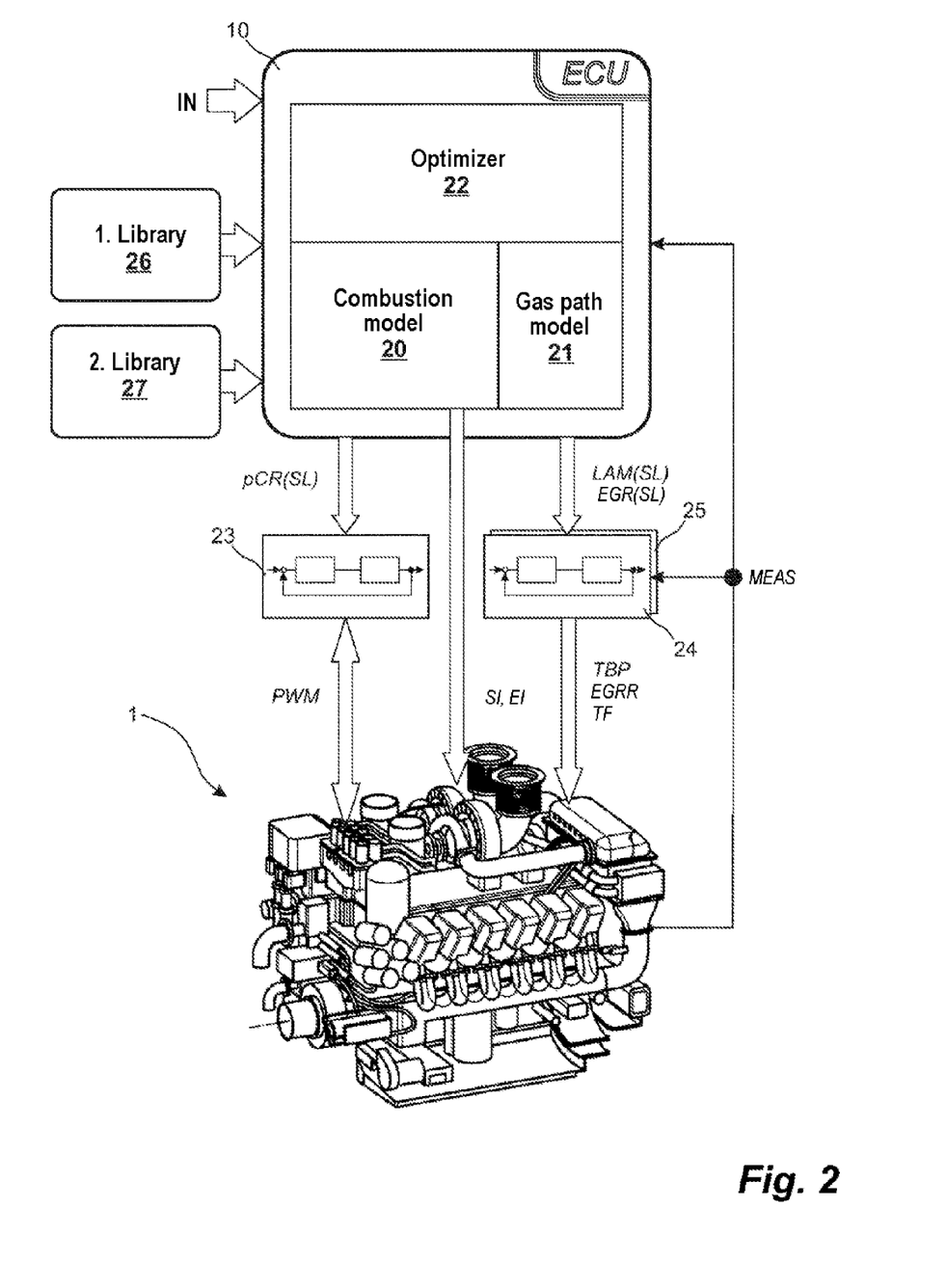
FIG. 2 shows a model-based system diagram.

FIG. 2 shows a model-based system diagram. In the case of this representation, a combustion model 20, a gas path model 21 and an optimizer 22 are listed within electronic control unit 10. Both combustion model 20 and gas path model 21 map the system characteristics of the internal combustion engine as mathematical equations. Combustion model 20 statically maps the processes during combustion.

In contrast to this, gas path model 21 also maps the dynamic characteristics of the air guidance and the exhaust gas guidance. Combustion model 20 contains single models, for example, for NOx and soot generation, for the exhaust gas temperature, for the exhaust gas mass flow and for the peak pressure. These individual models are in turn dependent on the framework conditions in the cylinder and the injection parameters. Combustion model 20 is determined in the case of a reference internal combustion engine on a test stand, what is known as the DoE test stand run (DoE: Design of Experiments). In the case of the DoE test stand run, operating parameters and actuating variables are varied systematically with the aim of mapping the overall characteristics of the internal combustion engine as a function of engine variables and environmental framework conditions. A first library 26 and a second library 27 are additionally represented. The two libraries can be integrated in electronic control unit 10 or in a superordinate system controller, for example, in the case of a ship.

In a first step, optimizer 22 reads the emission class from first library 26. The term emission class refers, for example, to an operation of the internal combustion engine in accordance with the MARPOL (Marine Pollution) of the IMO or EU IV/Tier 4 final. In a second step, a maximum mechanical component load, for example, the combustion peak pressure or the maximum rotational speed of the exhaust gas turbocharger, is read in from second library 27 on the basis of the internal combustion engine type. In one option, it is provided that the operator can change maximum values in the direction of lower values, as a result of which the maintenance interval can be reduced. The selected emission class and the selected maximum values of the mechanical component load are then set as binding for the further calculation within the combustion model and the gas path model. Thereafter, optimizer 22 evaluates combustion model 20 and indeed in terms of the setpoint moment M(SETP), the emission threshold values, the environmental framework conditions, for example, humidity phi of the charge air, and the operating situation of the internal combustion engine. The operating situation is defined by engine rotational speed nACT, charge air temperature TCA, charge air pressure pCA, etc. The function of optimizer 22 thus lies in evaluating the injection system setpoint values for actuating the injection system actuators and the gas path setpoint values for actuating the gas path actuators. In this case, optimizer 22 selects the solution in the case of which a quality measure is minimized. The quality measure is calculated, for example, as an integral of the quadratic setpoint/actual deviations within the prediction horizon. For example, in the form:

$$J=\int [w1(NOx(SETP)-NOx(ACT))]^2+[w2(M(SETP)-M(ACT))]^2+[w3(\ldots)]+\ldots \quad (1)$$

In this case, w1, w2 and w3 signify a corresponding weighting factor. As is known, the nitrogen oxide emission is produced from humidity phi of the charge air, the charge air temperature, start of injection SI and rail pressure pCR.

A restriction of actuating variables AV and a restricting function RF are taken into account in equation (1). The following applies for this:

$$AV(min) \leq AV \leq AV(max) \text{ and} \quad (2)$$

$$RF \leq Max \quad (3)$$

Actuating variables are, for example, the start of injection and the end of injection, A restricting function is, for example, the maximum combustion pressure, a maximum rotational speed of the exhaust gas turbocharger or a maximum exhaust gas temperature.

The quality measure is minimized in that a first quality measure is calculated by optimizer 22 at a first point in time via equation (1). Thereafter, the injection system setpoint values as well as the gas path setpoint values are varied and a second quality measure within the prediction horizon is forecast via equation (1). On the basis of the deviation of the two quality measures from one another, optimizer 22 then defines the actuating variables for a minimum quality measure and sets this decisively for the internal combustion engine. In the case of the example represented in the figure, these are, for the injection system, setpoint rail pressure pCR(SL) and start of injection SI as well as end of injection EI. Setpoint rail pressure pCR(SL) is the guide variable for subordinate rail pressure regulation circuit 23. The actuating variable of rail pressure regulation circuit 23 corresponds to the PWM signal for actuation of the suction throttle. The injector (FIG. 1: 7) is directly acted upon with start of injection SI and end of injection EI. Optimizer 22 indirectly determines the gas path setpoint values for the gas path. In the case of the represented example, this is a lambda setpoint value LAM(SL) and an EGR setpoint value EGR(SL) for predefinition for lambda regulation circuit 24 and EGR regulation circuit 25. Recirculated measurement variables MEAS are read in by electronic control unit 10. Measurement variables MEAS refer both to directly measured physical variables and auxiliary variables calculated from them. In the case of the represented example, lambda actual value LAM(ACT) and EGR actual value EGR(ACT) are read in.

Figures 3, 3A:
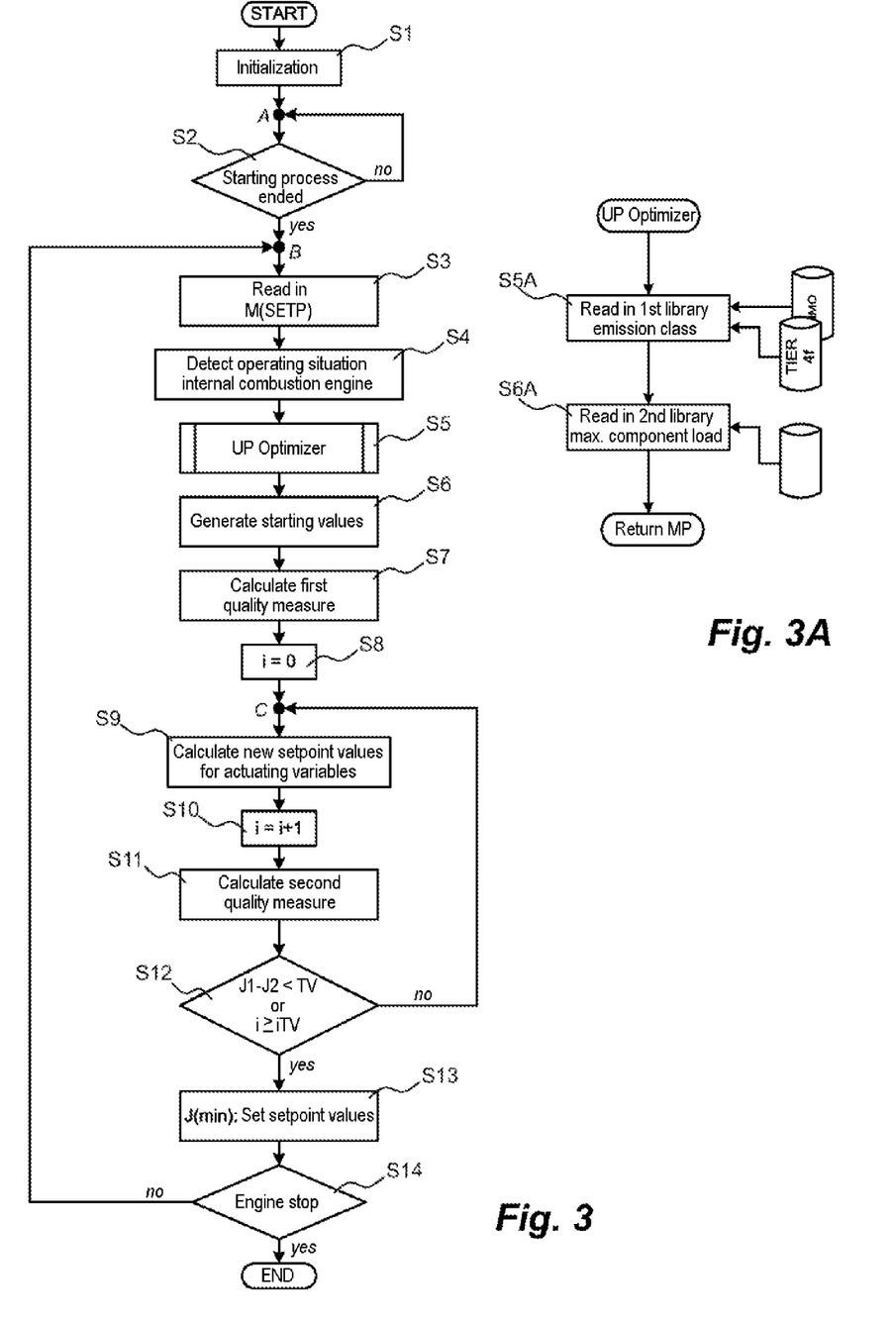
FIG. 3 shows a program flowchart.
FIG. 3a shows a sub-program flowchart.

In FIG. 3, the method is represented in a program flowchart, wherein a sub-program is represented in FIG. 3A.

After initialization in S1, a check is performed in S2 as to whether the starting process has ended. If it is still running, query result S2: No, the process switches back to point A. If the starting process has ended, in the case of S3, the setpoint moment M(SETP) which can be predefined by the operator is read in. Subsequently, in S4, the operating situation of the internal combustion engine is detected. The operating situation is defined via the measurement variables, in particular via engine rotational speed nACT, charge air temperature TCA, charge air pressure pCA, humidity phi of the charge air, etc. In S5, the sub-program optimizer of FIG. 3A is called up. In this sub-program, in S5A, an emission class which is specific to the place of use, for example, IMO or Tier 4 final, is read in from the first library. Thereafter, in S6A, the maximum component load is read in from the second library, for example, a maximum combustion peak pressure of 200 bar. The process subsequently switches back into the main program of FIG. 3 to step S5.

In S6, the initial values are then generated, for example, start of injection SI. A first quality measure J1 is calculated on the basis of equation (1) in S7 and in S8 a running variable i is set to zero. Thereafter, in S9, the initial values are changed and calculated as new setpoint values for the actuating variables. In S10, running variable i is increased by one. Using the new setpoint values, in S11, a second quality measure J2 is then forecast within the prediction horizon, for example, for the next 8 seconds. In S12, second quality measure J2 is in turn subtracted from first quality measure J1 and compared with a threshold value TV. The further progress of the quality measure is checked via the difference between the two quality measures. Alternatively, on the basis of the comparison of running variables i with a threshold value iTV, a check is performed as to how often an optimization has already been run through. The two threshold value considerations are in this regard a cancellation criterion for a further optimization. If a further optimization is possible, query result S12: No, the process switches back to point C. Otherwise, in S13, second quality measure J2 is set by the optimizer as a minimum quality measure J(min). The injection system setpoint values and the gas path setpoint values for predefinition for the corresponding actuators then result from minimum quality measure J(min). A check is subsequently performed in S14 as to whether an engine stop was initiated. If this is not the case, query result S14: No, the process switches back to point B. Otherwise, the program flowchart is ended.

A first adjustment of the internal combustion engine in accordance with IMO3 is represented in FIG. 4. FIG. 4 comprises FIGS. 4A to 4D. In each case over time, FIG. 4A shows a moment profile, FIG. 4B shows nitrogen oxide emission NOx, FIG. 4C shows start of injection SI in degrees crankshaft angle in front of the upper dead center (DC) and FIG. 4D shows the profile of peak pressure PMax. A second adjustment of the internal combustion engine in accordance with Tier 4 final is represented in FIG. 5. FIG. 5 comprises FIGS. 5A to 5D which show the same variables over time as FIGS. 4A to 4D. The time range before t0 corresponds to the past. The prediction horizon, for example, 8 s, corresponds to time range t0 to t0+tp. ts designates a calculation time in the case of which a new setpoint value, for example, start of injection SI, is output by the electronic control unit.

Figure 4A:
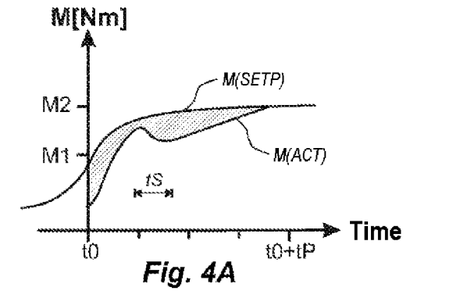
FIG. 4 shows time diagrams, adjustment 1
Figure 4B:
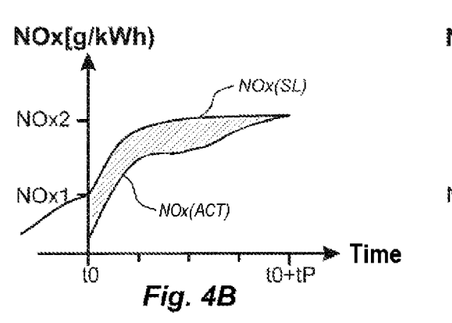
Figure 4C:
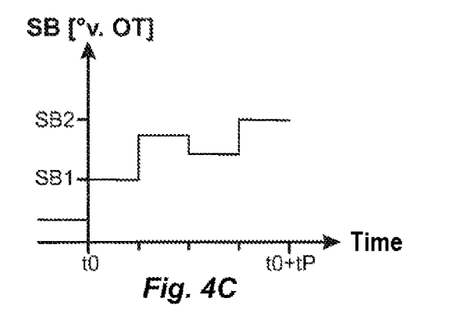
Figure 4D:
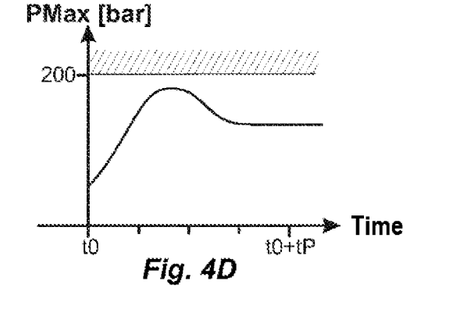
Figure 5A:
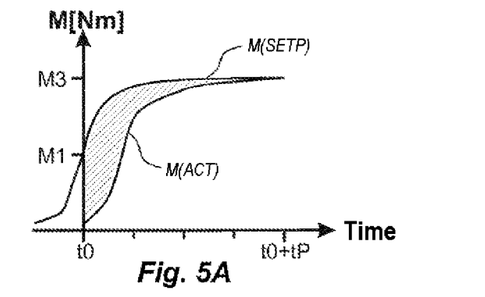
FIG. 5 shows time diagrams, adjustment 2.
Figure 5B:
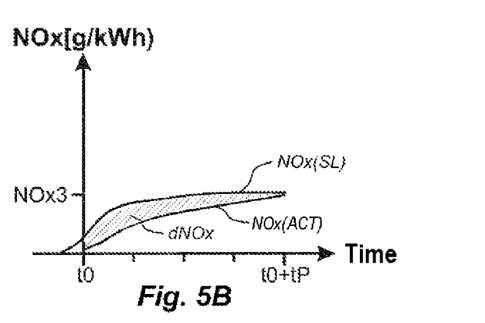
Figure 5C:
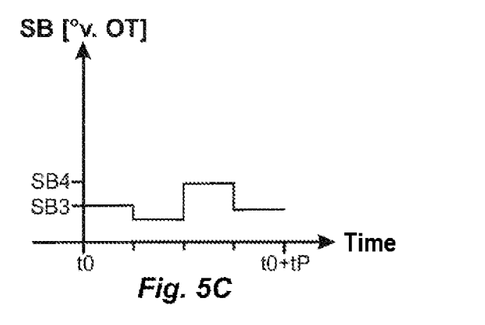
Figure 5D:
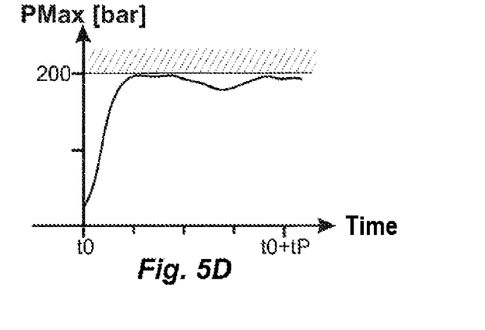

The process according to FIG. 4 will now be explained. A mode of operation was selected by the operator in the case of which the full power of the internal combustion engine is supposed to be exploited. Once the starting process has concluded, the emission class for the operation of the internal combustion engine is read in by the optimizer from the first library, here, therefore the emission class in accordance with IMO3. Thereafter, the maximum mechanical component load is read out by the optimizer from the second library on the basis of the internal combustion engine type, for example, the maximum combustion pressure of PMax=200 bar (FIG. 4D).

The input variable is a setpoint moment M(SETP) which can be predefined by the operator, here: end value M2. At starting value M1 of the setpoint moment, a NOx setpoint value NOx1 (FIG. 4B) and a start of injection SI1 (FIG. 4C) correspond to point in time t0. The actual moment M(ACT) and the NOx actual value NOx(ACT) are also read in at point in time t0. The NOx actual value is calculated as a function of the measured air pressures in the air path and of start of injection SI, here: SI1 (FIG. 4C). In FIG. 4A, the deviation of the actual moment M(ACT) from the setpoint moment M(SETP) is represented as a hatched area. In FIG. 4B, the deviation of NOx actual value NOx(IST) from NOx setpoint value NOx(SL) is represented as a hatched area. At point in time t0, the optimizer calculates a first quality measure via equation (1). The optimizer subsequently changes the indirect and direct actuating variables and calculates the actuating variables for a second quality measure via equation (1). The indirect and direct actuating variables are represented in FIG. 2. Start of injection SI is represented as an exemplary actuating variable in FIG. 4C. In other words, the optimizer determines at point in time t0 how a change in relation to the example of start of injection SI from starting value SI1 to end value SI2 acts within the prediction horizon. The quality measure is minimized via the difference between the second quality measure and the first quality measure and threshold value consideration, i.e. a check is performed as to whether further optimization is promising. It is apparent from FIGS. 4A and 4B that, at point in time t0+tP, a further improvement in the second quality measure is no longer promising since here the actual values correspond to the setpoint values.

FIG. 5 is based on an emission class according to Tier 4 final and a mode of operation is selected by the operator in the case of which the combustion pressure should always be significantly lower than maximum combustion pressure PMax, as a result of which an elongated period of operation arises. The setpoint moment is increased from starting value M1 to end value M3 by the operator. The calculation of first and second quality measure via equation (1) corresponds to the description of FIG. 4. The influence of the two libraries becomes clear from the comparison of FIGS. 4 and 5. The NOx setpoint value NOx(SL) in FIG. 5B is oriented significantly to lower values and, as a result of the profile of the combustion pressure at maximum threshold PMax, a higher actual moment M(ACT) can be reached at a significantly earlier point in time.

REFERENCE SIGNS

1 Internal combustion engine
2 Fuel tank
3 Low-pressure pump
4 Suction throttle
5 High-pressure pump
6 Rail
7 Injector
8 Individual store
9 Rail pressure sensor
10 Electronic control unit
11 Exhaust gas turbocharger
12 Charge air cooler
13 Throttle flap
14 Entry point
15 Inlet valve
16 Outlet valve
17 EGR actuator (EGR: exhaust gas recirculation)
18 EGR cooler
19 Turbine bypass valve
20 Combustion model
21 Gas path model
22 Optimizer
23 Rail pressure regulation circuit
24 Lambda regulation circuit
25 EGR regulation circuit
26 First library
27 Second library

The invention claimed is:

1. A method for model-based control and regulation of an internal combustion engine, comprising the steps of: reading in by an optimizer an emission class for operating the internal combustion engine from a first library; reading out a maximum mechanical component load by the optimizer from a second library based on internal combustion engine type; setting the emission class and the component load as binding for a combustion model and a gas path model; calculating via the combustion model, as a function of a setpoint moment, injection system setpoint values for actuating injection system actuators; calculating via the gas path model gas path setpoint values for actuating gas path actuators; calculating a quality measure by the optimizer as a function of the injection system setpoint values and the gas path setpoint values; minimizing the quality measure by the optimizer by changing the injection system setpoint values and the gas path setpoint values within a prediction horizon; and setting the injection system setpoint values and the gas path setpoint values as decisive for adjustment of an operating point of the internal combustion engine by the optimizer based on the minimized quality measure.

2. The method according to claim 1, wherein legal emission classes corresponding to the global area of application are stored in the first library.

3. The method according to claim 1, wherein the quality measure is minimized in that a first quality measure is calculated by the optimizer at a first point in time, a second quality measure is forecast with the prediction horizon at a second point in time, a deviation from first and second quality measure is determined and the second quality measure is set as a minimized quality measure by the optimizer, in the case of which the deviation becomes smaller than a threshold value.

4. The method according to claim 1, wherein the quality measure is minimized in that a first quality measure is calculated by the optimizer at a first point in time, a second quality measure is forecast within the prediction horizon at a second point in time and the second quality measure is set by the optimizer as the minimized quality measure after running through a predefinable number of new calculations.

5. The method according to claim 1, wherein a rail pressure setpoint value for a subordinate rail pressure regulation circuit) is predefined indirectly by the optimizer as the injection system setpoint value.

6. The method according to claim 1, wherein a start of injection and an end of injection for actuating an injector are predefined directly by the optimizer as the injection system setpoint value.

7. The method according to claim 1, wherein gas path setpoint values for subordinate gas path regulation circuits are predefined indirectly by the optimizer.

* * * * *